Sept. 10, 1968            D. PARILLA            3,400,589
REFERENCE PRESSURE COMPARING BAROMETER
Filed July 8, 1966
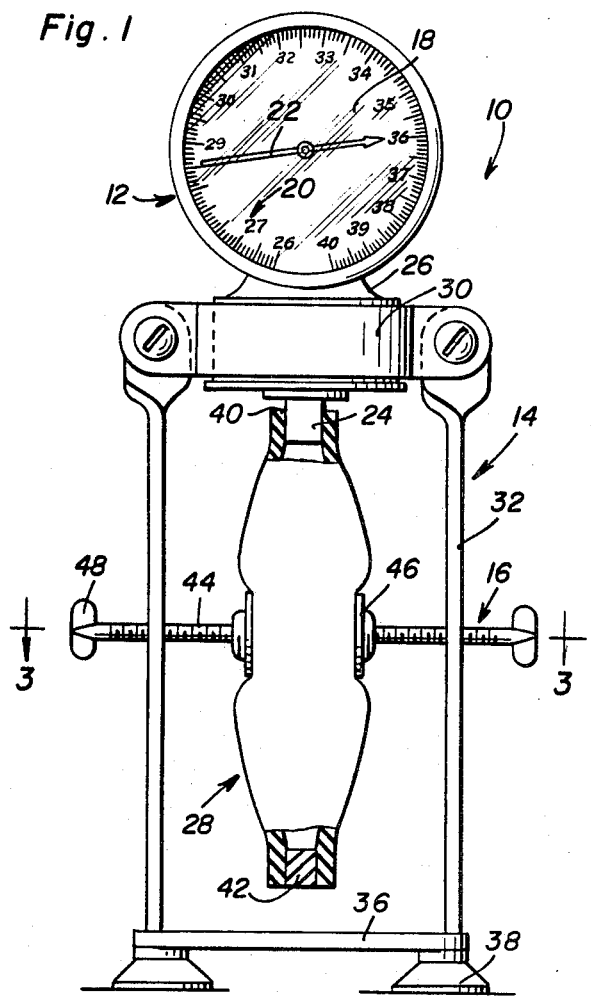
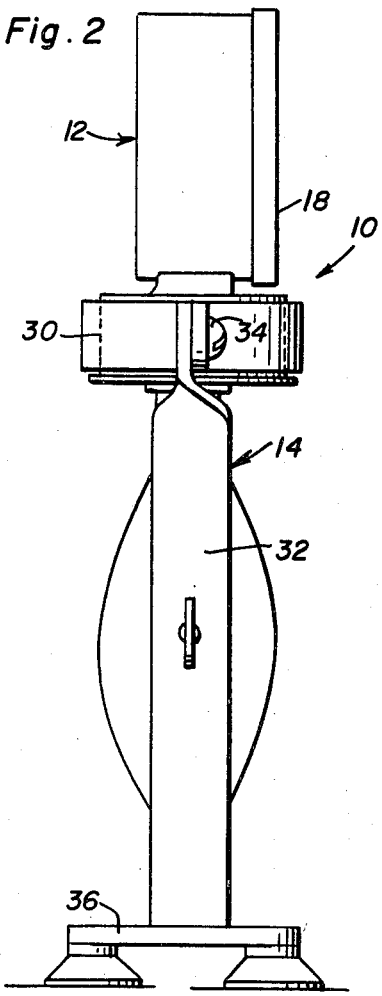
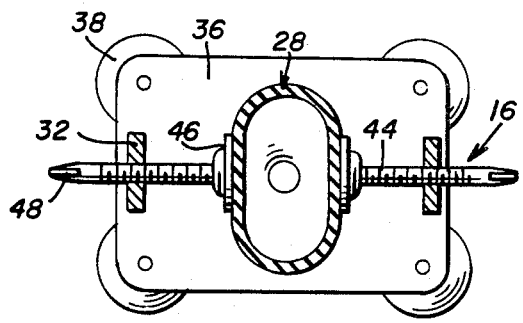
Daniel Parilla
INVENTOR.
BY *Clarence A. O'Brien*
*and Harvey B. Jacobson*
Attorneys

United States Patent Office 3,400,589
Patented Sept. 10, 1968

3,400,589
REFERENCE PRESSURE COMPARING BAROMETER
Daniel Parilla, 331 S. 1st St., Brooklyn, N.Y. 11211
Filed July 8, 1966, Ser. No. 563,853
3 Claims. (Cl. 73—409)

ABSTRACT OF THE DISCLOSURE

A flexible pressure sensing bulb is connected to the input of a barometer mounted on a frame. Adjustable clamps engage the bulb within the frame to establish a reference pressure within the bulb to which the barometer is exposed producing a reference pressure reading.

---

This invention relates to the measurement of fluid pressure and more particularly to the calibrating of pressure measurements.

A primary object of the present invention therefore is to provide in combination with a pressure measuring device, means for comparing or calibrating pressure readings of said device with a reference pressure value.

In accordance with the foregoing object, a pressure measuring device such as an aneroid barometer or the pressure measuring device associated with a sphygmomanometer is mounted on a frame and is connected to a pressure sensing bulb through which the initial pressure measured may be varied by means of adjustable bulb engaging facilities.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a front elevational view with parts broken away and shown in section of the apparatus of the present invention.

FIGURE 2 is a side elevational view of the apparatus shown in FIGURE 1.

FIGURE 3 is a top sectional view taken substantially through a plane indicated by section line 3—3 in FIGURE 1.

Referring now to the drawings in detail, the apparatus of the present invention generally denoted by reference numeral 10 is associated with a relatively sensitive pressure measuring device 12 such as commonly associated with a medical sphygmomanometer. The pressure measuring device is mounted on a frame assembly generally referred to by reference numeral 14 which mounts adjusting means 16 for regulating the reading of the pressure measuring device.

The pressure measuring device includes a dial face portion 18 on which pressure indicating indicia 20 is visible. As shown in FIGURE 1, the indicia 20 is in millimeter units. A pointer 22 is mounted by the dial portion so as to indicate a pressure reading corresponding to the pressure to which the inlet nozzle portion 24 is exposed. The inlet nozzle projects from the base portion 26 of the pressure measuring device and is connected to a pressure sensing bulb member 28 within the frame assembly 14.

The frame assembly includes a pair of clamp members 30 which embrace the base portion 24 of the pressure measuring device and are interconnected with each other and with a pair of connecting elements 32 by means of the fasteners 34. The connecting elements 34 extend in parallel spaced relation to each other between the clamp members 30 and an anchoring plate 36 to which the connecting elements are connected. Accordingly, the anchoring plate is fixedly spaced from the base portion 26 of the pressure measuring device a distance sufficient to accommodate the pressure sensing bulb member 28 disposed between the connecting elements 32. Also secured to the anchoring plate 36, are a plurality of suction cup elements 38 by means of which the apparatus may be conveniently and removably anchored at any desired location.

The bulb member 28 is made of a suitable flexible material such as rubber and has an open end 40 secured to the inlet nozzle 24 of the pressure measuring device, the opposite end of the bulb member being closed by the closure element 42. It will be apparent therefore, that the fluid enclosed within the bulb member will ordinarily vary in pressure in accordance with the fluid pressure exerted externally on the bulb member. Thus, the apparatus 10 may be disposed in any fluent medium such as the atmosphere or unnder water in order to record ambient pressure by means of the pressure measuring device. Since the pressure measuring device 12 is operative to record only air pressure for example, enclosure of air under pressure within the bulb member 28 will permit the apparatus to measure any fluid medium. Further, the apparatus will also provide means for calibrating or comparing pressure readings with a reference pressure.

Toward this end, the adjustable facilities 16 are provided whereby the internal pressure within the bulb member 28 may be selectively varied as desired. The adjusting facilities include therefore, a pair of screw elements 44 threadedly mounted by the connecting elements 32 in axial alignment with each other. Connected to the screw elements within the frame assembly, are a pair of opposed bulb engaging elements 46 while the outer ends of the screw elements outside of the frame assembly are provided with adjusting knobs 48. It will be apparent therefore, that the screw elements 44 may be axially displaced by means of the knobs 48 compressing the bulb member as shown until the pressure indicator pointer 22 is displaced from a zero readings to a reference reading such as 14.7 pounds per square inch at sea level air pressure. The apparatus may then be utilized as an air pressure indicating barometer or as an altimeter. The apparatus may also be utilized under water for depth measuring purposes. It will of course be appreciated that pressure measurements may be taken from other reference pressures to which the apparatus is adjusted in order to measure increases or decreases from the reference pressure in any direction in which the apparatus is moved through the fluent medium.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:
1. In combination with a pressure measuring device, a supporting frame fixedly mounting the pressure measuring device, a pressure sensing member connected to said pressure measuring device and adjustable means mounted by the frame for engaging with said member in spaced relation to the pressure measuring device to vary pressure internally of the member and the reference pressure reading of the pressure measuring device corrsponding thereto, said pressure measuring device including a dial reading portion, a base and an inlet portion projecting from the base, said supporting frame including clamp means secured to the base, an anchoring portion spaced from the clamp means and a pair of connecting elements interconnecting the clamp means and the anchoring portion, said pressure sensing member being connected to the inlet portion of the pressure measuring device and extending therefrom between the connecting elements, the adjustable means being mounted by the connecting elements.

2. The combination of claim 1 wherein said pressure sensing member comprises a flexible bulb having an opened end connected to the pressure measuring device and a closed end.

3. The combination of claim 2 wherein said adjustable means includes a pair of screw elements threadedly mounted by the connecting elements of the frame, bulb engaging members connected to the screw elements within the frame, and adjusting knobs connected to the screw elements outside of the frame.

References Cited

UNITED STATES PATENTS 2,931,225    4/1960    Pleuger _____ 73—300

FOREIGN PATENTS 619,092    9/1935    Germany.

DAVID SCHONBERG, *Primary Examiner.*

D. E. CORR, *Assistant Examiner.*